United States Patent

[11] 3,603,369

| [72] | Inventor | William A. Scholz<br>Ontario, Canada |
|---|---|---|
| [21] | Appl. No. | 844,725 |
| [22] | Filed | July 2, 1969 |
| [45] | Patented | Sept. 7, 1971 |
| [73] | Assignee | Standun, Inc.<br>Compton, Calif. |

[54] PRODUCE WRAPPER
6 Claims, 2 Drawing Figs.

[52] U.S. Cl. .................................................. 150/52 R,
150/1.7, 229/87 F, 229/DIG. 3
[51] Int. Cl. .......................................................... B65d 65/10
[50] Field of Search ............................................ 229/DIG. 3,
87 F; 150/52, 1.7

[56] References Cited
UNITED STATES PATENTS
2,766,797  10/1956  Cowen .......................... 150/52

3,040,968  6/1962  Long ............................. 229/87 F
3,069,067  12/1962  Crane ......... ................. 229/87 F FOREIGN PATENTS
350,767  1/1961  Switzerland .................. 229/DIG. 3

Primary Examiner—Donald F. Norton
Attorney—Mahoney, Hornbaker & Schick

ABSTRACT: This invention provides a produce-wrapping device formed by a square sheet of pliable, transparent plastic having sets of rows of slits inwardly of the marginal edges, two of the sets of slits being in opposite quarters of the sheet and parallel to one diagonal, while the other two sets of slits are in the other opposite quarters of the sheet and parallel to the other diagonal, whereby, when the corners of the sheet are brought around a quantity of produce and tied, the produce is retained and the slits in the sheet are caused to open up and provide ventilation.

PRODUCE WRAPPER

BACKGROUND OF THE INVENTION

1. The Field of the Invention

This invention pertains to wrappers for produce or the like.

2. The Prior Art

In the retail marketing of produce, packaging is 3,109,579 for retaining and protecting fruits and vegetables. For larger solid items, such as head lettuce and cauliflower, a suitable wrapping consists of a sheet of plastic having parallel rows of slits cut through it. The opposite corners of the sheet, transverse to the rows of slits, are brought together around the produce and tied. This provides an effective wrapping, as the slits open up when the two corners are tied, providing ventilation for the produce within. Examples of this type of arrangement may be seen in U.S. Pat. Nos. 3,040,968, 3,069,067, 3,109,579 and 3,245,606.

A large item, such as a head of lettuce or a cauliflower, is securely retained within a wrapping of this nature. It is not satisfactory, however, for smaller fruits and vegetables, such as grapes, cherries and cherry tomatoes. These will not be retained by a single knot formed in the opposite corners, and will be allowed to spill out where the other corners are not secured together. The problem is not solved by tying all four corners to form more of an enclosed container to hold the produce. When this is done, tension necessarily is applied to the plastic sheet in the direction aligned with the rows of slits. Consequently, they are caused to close up and, in effect, make the wall of the sheet imperforate. This means that air cannot circulate to the produce contained, and the requisite ventilation is absent. Hence, commercial use of such wrappings has been for the larger produce items only.

Conventionally, smaller items of produce frequently are sold in trays or baskets open at the top. However, these allow the small produce articles to spill out and become lost. Because the produce is not securely retained, preweighing and marking are prohibited, so that the fruits or vegetables must be weighed at the checkstand when purchased. This slows down and, hence, adds to the cost of the retailing operation. It is not satisfactory to place covers over the tops of the trays because this does not provide adequate ventilation and generally does not retain the fruits or vegetables securely.

Summary of the Invention

The present invention provides an improved means that effectively holds small articles without danger of spilling or tampering, while still assuring fully ample ventilation. The device is made from a sheet of pliable material, such as thin, transparent polyethylene plastic. It is of square outer perimeter and provided with four sets of rows of slits in its inner portions. Two of the sets of rows are in opposite quarters of the sheet and parallel to one of the diagonals. The other two sets of rows are in the other two opposite quarters of the sheet, parallel to the other diagonal and perpendicular to the first two sets of slits. At the center of the sheet and around its margins there are no perforations. In use, the produce is placed on the sheet, and a first pair of opposite corners is brought together and tied. Then, the second pair of opposite corners is brought together and tied. This forms a compact pouch that securely retains the produce. Because there are four sets of diagonally arranged slits, the sheet of plastic is stressed transversely of all of the slits. This means that all of the slits open up, producing a multiplicity of apertures and adequate ventilation throughout the package.

An object of this invention is to provide an improved means for wrapping produce.

Another object of this invention is to provide a means for wrapping a quantity of small produce or other items to provide a secure and ventilated package.

A further object of this invention is to provide a produce-wrapping arrangement which is simple to manufacture, low in cost and easy to use.

These and other objects will become apparent from the following detailed description taken in connection with the accompanying drawing.

DESCRIPTION OF THE PREFERRED EMBODIMENT

Figure 1:
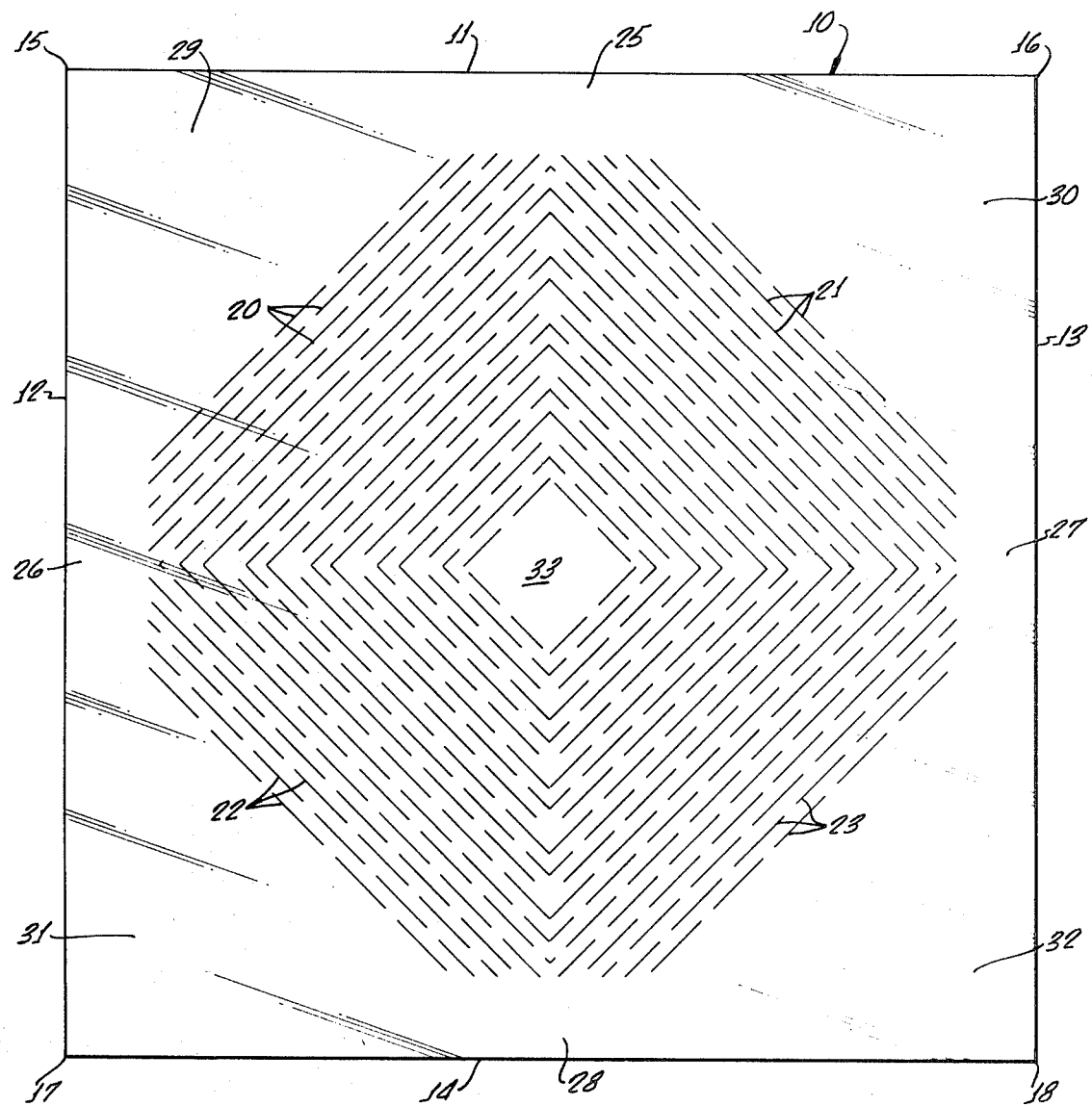
FIG. 1 is a plan view of a produce-wrapping device embodying the invention.

As illustrated in the drawing, the produce wrap 10 of this invention is made up of a sheet of pliable material, preferably a thin, transparent, low-cost plastic, such as polyethylene. The sheet 10 is of square configuration, providing straight side edges 11, 12, 13 and 14, and right-angle corners 15, 16, 17 and 18. Inwardly of the side edges and the corners, the sheet of plastic material is cut to form four sets of rows of slits 20, 21, 22 and 23. This is accomplished by a suitable die, which merely severs the material at the location of each slit. Alternatively, the slits may be defined by cutouts that define elongated openings, although normally it is cheaper and fully satisfactory merely to sever the material to produce the slits.

The rows of slits 20, 21, 22 and 23 are all diagonal with respect to the sheet of plastic 10. The two sets of rows 20 and 23 are parallel to each other and to a diagonal between them extending between corners 16 and 17. The other two sets of rows of slits 21 and 22 also are parallel to each other and are perpendicular to the rows 20 and 23. The sets of rows of slits 21 and 22 are parallel to and on opposite sides of a diagonal extending between the corners 15 and 18. In the adjacent rows of each set, the slits are in a staggered relationship. In other words, the gaps between the adjacent slits in one row are intermediate the ends of the slits in the rows next to it. The slits in alternate rows of each set may be in transverse alignment.

Each set of slits is positioned in one quarter of the square sheet 10 of plastic. Thus, the set of slits 20 is in the upper left quarter of the sheet as the device is illustrated in FIG. 1, and it extends at its edges to the sets of slits 21 and 22. The latter two sets of slits are in the upper right quarter and lower left quarter, respectively. The remaining slits 23 are in the lower right quarter of the sheet. The slits are spaced inwardly of the side edges 11, 12, 13 and 14 of the sheet and collectively define an octagon around the outer perimeter of the group of slits. As a result, there are marginal portions 25, 26, 27 and 28 adjacent the side edges 11, 12, 13 and 14 where the sheet 10 is unperforated. The slits are spaced a greater distance from the corners of the sheet, so that there are relatively large uncut portions 29, 30, 31 and 32 inwardly of the corners 15, 16, 17 and 18. At the center of the sheet 10 is a relative small, square solid portion 34 of the sheet. In some instances, it may be preferred to enlarge the central portion 34 beyond the proportion illustrated in the example of FIG. 1, particularly where it is desired to apply a label to the wrapping. This also provides a location where the wrapping may be printed.

Figure 2:
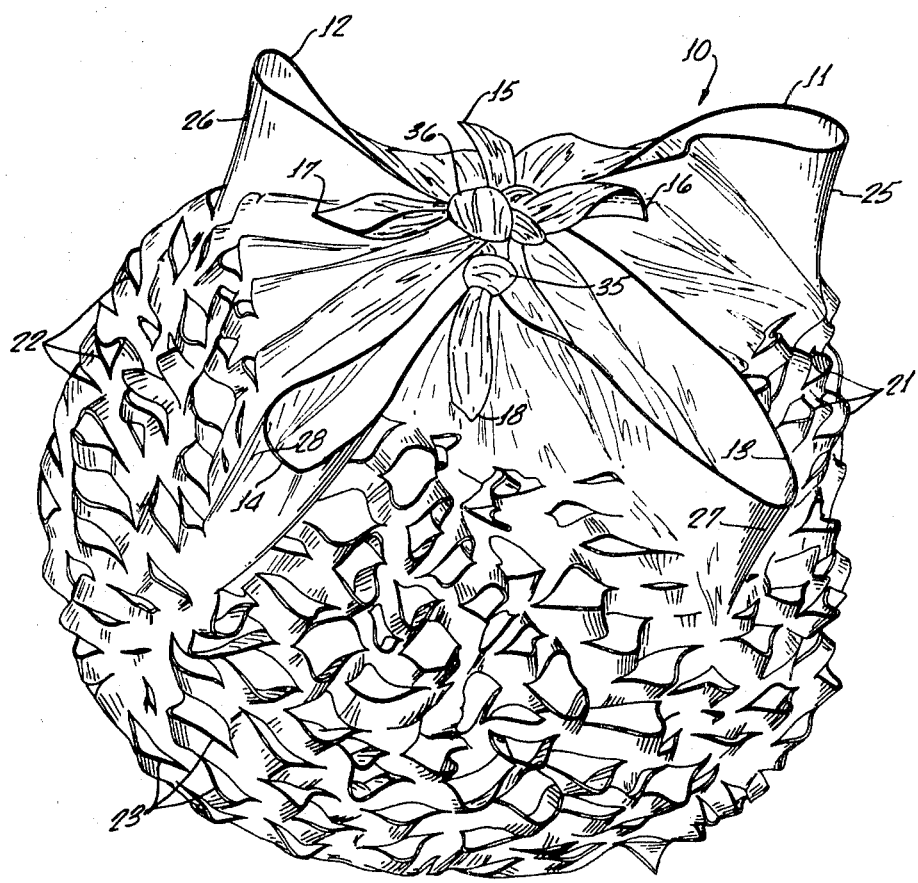
FIG. 2 is a perspective view of the device in use for wrapping a quantity of produce.

In use of the produce wrap, the articles to be packaged are positioned on the central portion of the square sheet of plastic 10. This places them over the central portion 34 and the sets of slits 20, 21, 22 and 23. Then, two opposite corners are brought together over the top of the produce on the sheet 10. For example, the opposite corners 15 and 18 may be brought together, whereupon they are tied to form a knot 35, as illustrated in FIG. 2. Next, the other two opposite corners 16 and 17 are brought together and tied in a knot 36, as seen in FIG. 2. As a result of this simple operation, the produce is securely retained within the pouch that is produced as the opposite corners are tied together. The marginal portions 25, 26, 27 and 28 become folded substantially double, as shown in FIG. 2, and almost completely enclose all gaps at the top of the package.

An important advantage of the wrapping thus produced for the produce is that it is ventilated throughout its entire area.

This is because the tension produced in the sheet 10 when the four opposite corners are tied pulls on the slits 20, 21, 22 and 23 transversely to open them up. Each corner pulls along a diagonal and transversely of the rows of slits immediately inwardly of it. This results in openings at all of the slits for supplying ventilation to the interior of the wrapping. Thus, when the ends 15 and 18 are pulled together around the produce and the knot 35 formed, forces are applied to the plastic sheet which are transverse to the sets of slits 20 and 23. Consequently, these slits are pulled open to provide access to the interior of the package. Similarly, when the corners 16 and 17 are tied together in the knot 36, the sets of slits 21 and 22 are opened to provide vent apertures. On all sides, therefore, there is ventilation through the wall of the sheet 10, and air may circulate through the contents of the package.

I claim:
1. A device for wrapping produce or the like comprising:
a sheet of pliable material,
said sheet having a square perimeter,
said sheet having four sets of rows of slits therethrough,
each set including substantially parallel rows of slits with the slits of each row being substantially parallel to the slits of all other rows of that set throughout that set,
the rows in the first two of said sets being substantially parallel with said sets spaced apart over at least the major portions thereof,
the rows in the second two of said sets being substantially parallel and at an angle in the order of 90° relative to said rows in said first two sets of slits with said sets being spaced apart by said first two sets of slits at least over the major portions thereof,
said rows of said first two sets of slits being substantially parallel to one diagonal of said sheet and free of parallelism with any of said sheet perimeter,
said rows of said second two sets of slits being substantially parallel to the other diagonal of said sheet and free of parallelism with any of said sheet perimeter.
2. A device as recited in claim 1 in which:
said sets of slits are spaced inwardly from the side edges of said sheet to provide marginal portions of said sheet free of said slits,
said marginal portions free of said slits being of greater width at the corners of said sheet than at locations intermediate said corners.
3. A device as recited in claim 1 in which:
said sets of slits do not extend to the center of said sheet, thereby providing a central portion of said sheet free of said slits,
said sheet central portion being free of openings therethrough.
4. A device as recited in claim 1 in which:
said square sheet is of transparent plastic material having said first and second sets of slits formed therethrough.
5. A device for wrapping produce or the like comprising:
a sheet of pliable material,
said sheet being of substantially square configuration and having a plurality of sets of rows of slits therethrough,
each set including substantially parallel rows of slits,
said rows of said first two sets of slits being substantially parallel to one diagonal of said sheet,
said rows of said second two sets of slits being substantially parallel to the other diagonal of said sheet,
and said sets of slits collectively defining an octagonal figure around the periphery thereof.
6. A device for wrapping produce or the like comprising:
a sheet of pliable material defining a sheet periphery,
said sheet having a plurality of sets of rows of slits therethrough,
each set including a plurality of substantially parallel rows of slits,
the rows of certain of said sets being at an angle relative to the rows of certain others of said sets,
and said sets of slits collectively defining an octagonal figure around the periphery of said sheet spaced inwardly of said periphery.